United States Patent [19]

Kobayashi et al.

[11] Patent Number: 5,054,003
[45] Date of Patent: Oct. 1, 1991

[54] ULTRASONIC GROUND SPEEDOMETER UTILIZING DOPPLER EFFECT

[75] Inventors: Hiroshi Kobayashi, Yokohama; Toshiya Kimura, Yokosuka; Masami Negishi, Yokohama, all of Japan

[73] Assignee: Nissan Motor Company, Limited, Kanagawa, Japan

[21] Appl. No.: 514,014

[22] Filed: Apr. 26, 1990

[30] Foreign Application Priority Data

Apr. 28, 1989 [JP] Japan .................................. 1-107319

[51] Int. Cl.$^5$ ............................................. G01S 15/00
[52] U.S. Cl. ......................................... 367/91; 367/140
[58] Field of Search .................. 181/123, 124; 367/90, 367/91, 140, 135, 157, 180; 342/92, 115, 195

[56] References Cited

U.S. PATENT DOCUMENTS 2,770,795  11/1956  Peterson ............................... 367/91
3,898,878   8/1975  Stellworth et al. ................ 367/91 X
4,728,954   3/1988  Phelan et al. ....................... 367/91 X

FOREIGN PATENT DOCUMENTS

0203973  11/1984  Japan ...................................... 367/91
1-107319   4/1989  Japan .

Primary Examiner—Brian S. Steinberger
Attorney, Agent, or Firm—Lowe, Price, Leblanc & Becker

[57] ABSTRACT

An ultrasonic ground speedometer utilizing Doppler effect comprises an ultrasonic transmitter for outputting an ultrasonic wave having a particular wavelength at a predetermined angle against a road surface, an ultrasonic receiver for receiving a reflected ultrasonic wave caused by reflection of the output ultrasonic wave from the road surface, and a signal processor for deriving ground speed from Doppler shift between the output ultrasonic wave and the reflected ultrasonic wave. The particular wavelength is set to a value within a range of 2.6 mm through 3.4 mm to assure the highest possible S/N ratio for the Doppler shift signal obtained from the signal processor.

6 Claims, 6 Drawing Sheets

ULTRASONIC GROUND SPEEDOMETER UTILIZING DOPPLER EFFECT

BACKGROUND OF THE INVENTION

1. Field of the Invention

The present invention relates to an ultrasonic ground speedometer utilizing Doppler effect which is for example adapted for detection of vehicle speed over the ground. Specifically to a speedometer which is capable of providing high accuracy and high responsiveness of ground speed measurement, irrespective of the state of road surface, namely, rough or smooth surfaces.

2. Description of the Prior Disclosure

Recently, there have been developed and proposed various ultrasonic ground speedometers. Such ground speedometers generally include an ultrasonic transmitter for outputting an ultrasonic wave, an ultrasonic receiver for receiving an ultrasonic wave reflected from the road surface and for generating a reflected ultrasonic wave signal, and an arithmetic circuit for deriving ground speed from a Doppler shift occurring in the output ultrasonic wave due to Doppler effect.

One such ultrasonic ground speedometer has been disclosed in Japanese Patent First Publication (Tokkai) Showa 60-76678.

However, in the above mentioned conventional ultrasonic ground speedometer, the wavelength of the output ultrasonic wave emitted from the ultrasonic transmitter would be freely selected from various values depending on characteristics of the ultrasonic transmitter and/or the ultrasonic receiver, beacuse of lack of sufficient analysis with regard to an optimal wavelength range for the output ultrasonic wave. For this reason, a sufficient S/N (signal-to-noise) ratio of a Doppler frequency signal representative of the Doppler shift between the output ultrasonic wave and the reflected ultrasonic wave would not be obtained. This results in relatively low accuracy of ground speed measurement.

SUMMARY OF THE INVENTION

It is, therefore, an object of the disclosed invention to provide an ultrasonic ground speedometer which can provide a high S/N ratio of a Doppler frequency signal representative of Doppler shift between an output ultrasonic wave generated from an ultrasonic transmitter and a reflected ultrasonic wave received by an ultrasonic receiver.

It is another object of the invention to provide an ultrasonic ground speedometer having high accuracy and high responsiveness in ground speed measurement.

In order to accomplish the aforementioned and other objects, an ultrasonic ground speedometer utilizing Doppler effect comprises ultrasonic transmitting means for outputting an ultrasonic wave having a particular wavelength at a predetermined angle against a road surface, the particular wavelength being set to a value within a range of 2.6 mm to 3.4 mm, ultrasonic receiving means for receiving a reflected ultrasonic wave caused by reflection of the output ultrasonic wave from the road surface, and arithmetic means for deriving ground speed from Doppler shift between the frequencies of the output ultrasonic wave from the ultrasonic transmitting means and the reflected ultrasonic wave received by the ultrasonic receiving means.

According to another aspect of the invention, an ultrasonic ground speedometer utilizing Doppler effect comprises ultrasonic transmitting means for producing an output signal having a particular wavelength, the ultrasonic transmitting means outputting an ultrasonic wave having the particular wavelength at a predetermined angle against a road surface, ultrasonic receiving means for receiving a reflected ultrasonic wave caused by reflection of the output ultrasonic wave from the road surface, the ultrasonic receiving means generating a reflected ultrasonic wave signal having the same frequency as the reflected ultrasonic wave, and signal processing means for generating a Doppler shift signal on the basis of the frequency difference between the output signal from the ultrasonic transmitting means and the reflected ultrasonic wave signal from the ultrasonic receiving means, the signal processing means deriving ground speed from the Doppler shift signal, and the particular wavelength being set to a value within a range of 2.6 mm through 3.4 mm to assure the highest S/N ratio for the Doppler shift signal.

The ultrasonic transmitting means may include an oscillator for generating the output signal having the particular wavelength within a predetermined wavelength range of 2.6 mm to 3.4 mm, an echo sounder transmitter for emitting the output ultrasonic wave having the particular wavelength, and a drive circuit for amplifying the oscillator output signal and for driving the echo sounder transmitter via the the amplified signal therefrom, and the ultrasonic receiving means includes an echo sounder receiver for receiving the reflected ultrasonic wave and for generating the reflected ultrasonic wave signal. The echo sounder transmitter and/or the echo sounder receiver may include a piezoelectric echo sounding microphone. The signal processing means includes a multiplier for deriving the frequency difference between the oscillator output signal frequency and the reflected ultrasonic wave signal frequency by multiplying both of the frequencies, a low-pass filter for filtering indersirable noise from the frequency difference signal generated from the multiplier, a zero-crossing comparator for waveform-shaping the filtered frequency difference signal representative of the Doppler shift signal, a pulse counter for counting pulses in the Doppler shift signal from the comparator and for deriving a Doppler frequency, and an arithmetic circuit serving as a Doppler-frequency/ground-speed convertor.

DESCRIPTION OF THE PREFERRED EMBODIMENT

Figure 1:
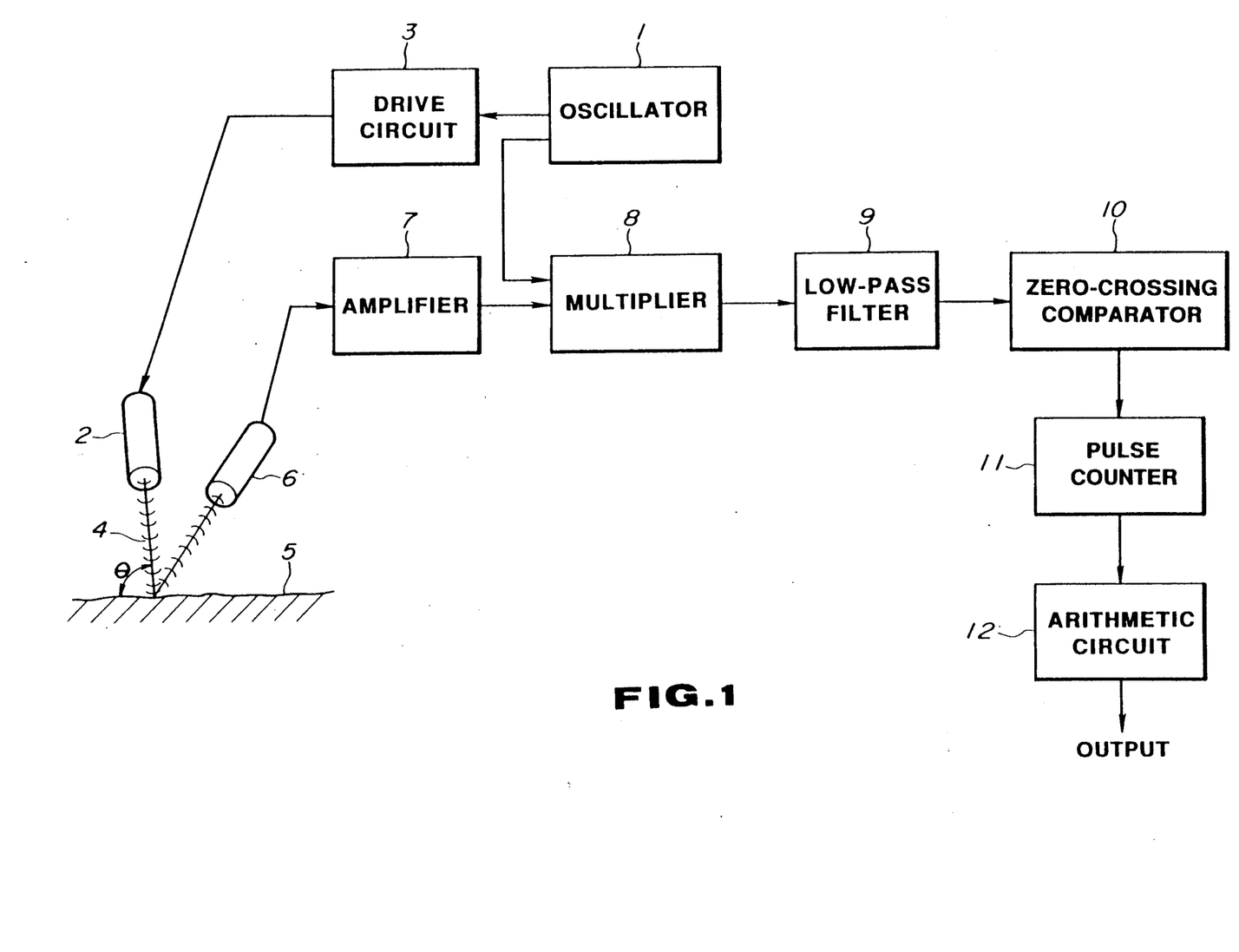
FIG. 1 is a block diagram illustrating an ultrasonic ground speedometer of one embodiment according to the invention.

Referring now to FIG. 1, an ultrasonic transmitter of an ultrasonic ground speedometer according to the invention includes an oscillator 1 for generating an output signal having a particular wavelength within a predetermined wavelength range of 2.6 mm to 3.4 mm essentially corresponding to an oscillator output frequency range of 131 kHz to 100 kHz, an echo sounder transmitter 2 for transmitting an ultrasonic wave having the particular wavelength, and a drive circuit 3 for amplifying the oscillator output signal and for driving the echo sounder transmitter 2 by the amplified signal output therefrom. A piezoelectric echo sounding microphone is commonly used as the transmitter 2. The transmitter 2 emits an ultrasonic wave 4 with the previously described particular wavelength against a road surface 5. The presetermined wavelength range of 2.6 mm to 3.4 mm was experimentally determined by the inventors of the present invention, the reasons for which determination will be described herein in detail. The ultrasonic ground speedometer of the invention also comprises an ultrasonic receiver including an echo sounder receiver 6 for both receiving a reflected ultrasonic wave caused by reflection of the output ultrasonic wave from the road surface, and for generating a reflected ultrasonic wave signal. An amplifier 7 is also included for amplifying the reflected ultrasonic wave signal. Traditionally, the echo sounder receiver 6 also consists of a piezoelectric echo sounding microphone. Additionally, the ultrasonic ground speedometer of the invention comprises a signal processor including a multiplier 8 for deriving the frequency difference between the oscillator output signal frequency and the reflected ultrasonic wave signal frequency by multiplying both of the frequencies, a low-pass filter 9 for filtering undesirable noise from the frequency difference signal generated from the multiplier 8, a zero-crossing comparator 10 for waveform-shaping the filtered frequency difference signal representative of Doppler shift in such a manner as to convert a sine wave to a square wave, a pulse counter 11 for counting pulses in the Doppler shift signal from the comparator 10 and for deriving a Doppler frequency, and an arithmetic circuit 12 serving as a Doppler-frequency/ground-speed convertor. As hereinbefore detailed according to the block diagram of FIG. 1, the ground speed is derived, based on the oscillator output signal frequency (the output ultrasonic wave frequency) and the reflected ultrasonic wave signal frequency (the reflected ultrasonic wave frequency). As is generally known, such an arithmetic circuit 12 derives the ground speed from the Doppler frequency according to the following equation:

$$f \approx 2 f_o \cdot v \cos \theta / C$$

wherein $f_d$ is a Doppler frequency or a Doppler shift, $f_o$ is a basic or output frequency of an output ultrasonic wave emitted from the transmitter, v is a vehicle speed, $\theta$ is an emitting angle of the output ultrasonic wave relative to the road surface 5 as seen in FIG. 1, and C is the sound velocity of the output ultrasonic wave.

FIGS. 2 to 8 are graphs illustrating various ultrasonic characteristics of the ultrasonic ground speedometer according to the invention, depending on the wavelength of the output ultrasonic wave. These ultrasonic characteristic test data are based on experimental data actually observed by the inventors of the present invention.

Figure 2:
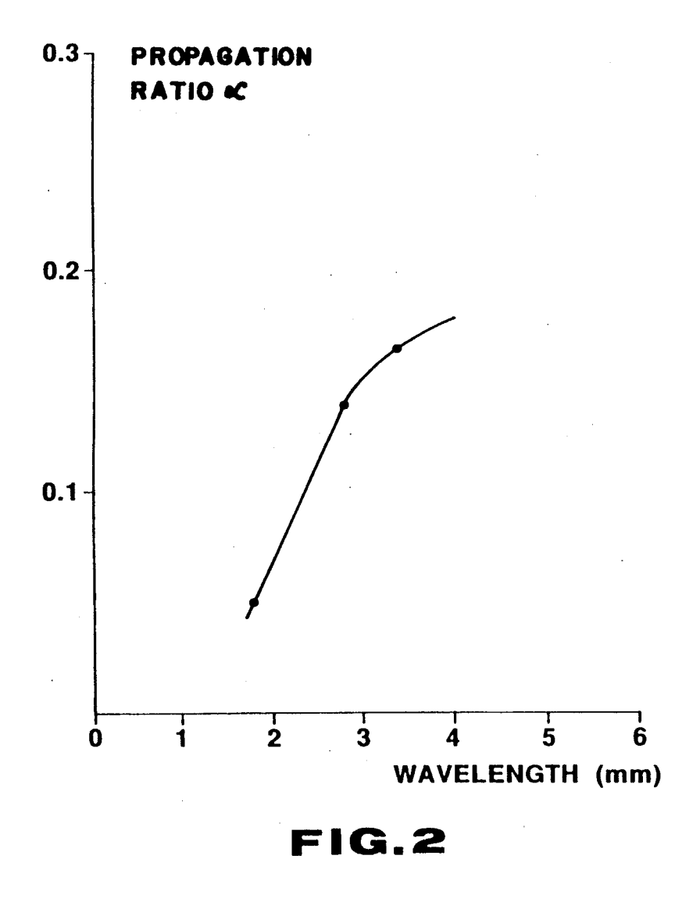
FIG. 2 is a graph illustrating the relationship between the 'propagation in-air' ratio of an ultrasonic wave and the ultrasonic wavelength.

As appreciated from FIG. 2, a ratio $\alpha$ of propagation in-air of the output ultrasonic wave from the transmitter 2 is decreased, as the wavelength becomes shorter, because there is a tendency for an ultrasonic wave with a shorter wavelength to be absorbed in air.

Figure 3:
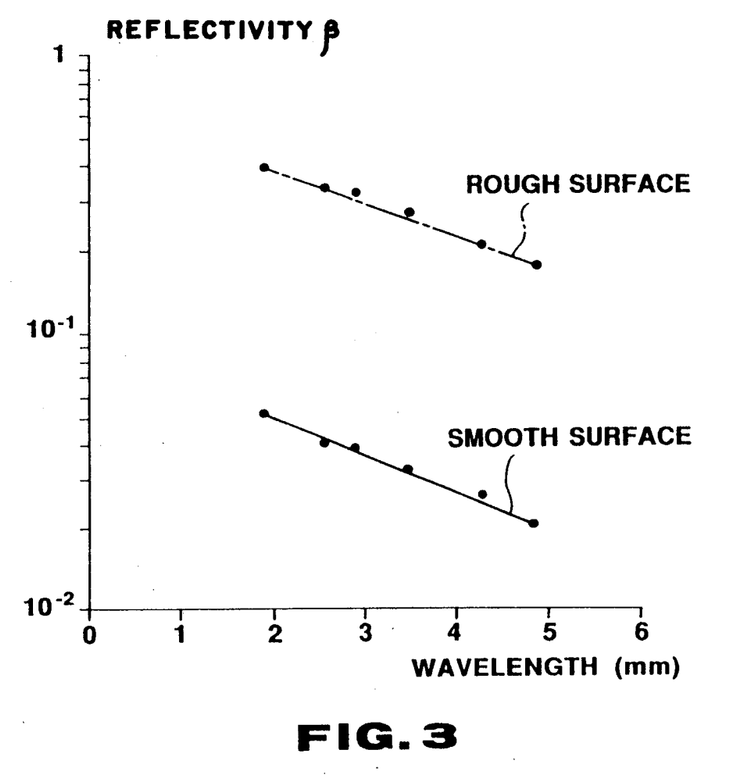
FIG. 3 is a graph illustrating the relationship between reflectivity of an ultrasonic wave and the ultrasonic wavelength.
Figure 4:
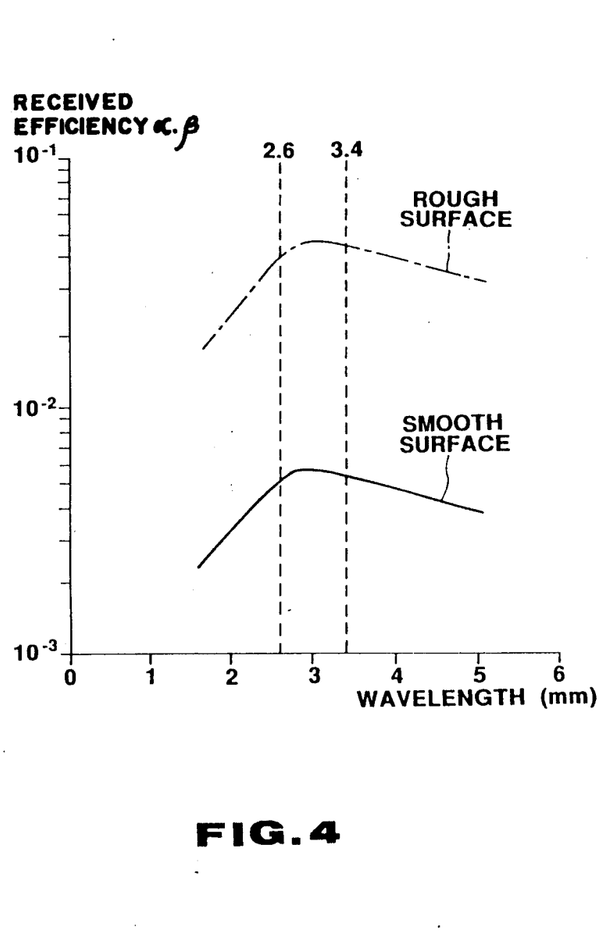
FIG. 4 is a graph illustrating received efficiency represented by the product of the 'propagation in-air' ratio and reflectivity, depending on the ultrasonic wavelength.
Figure 5:
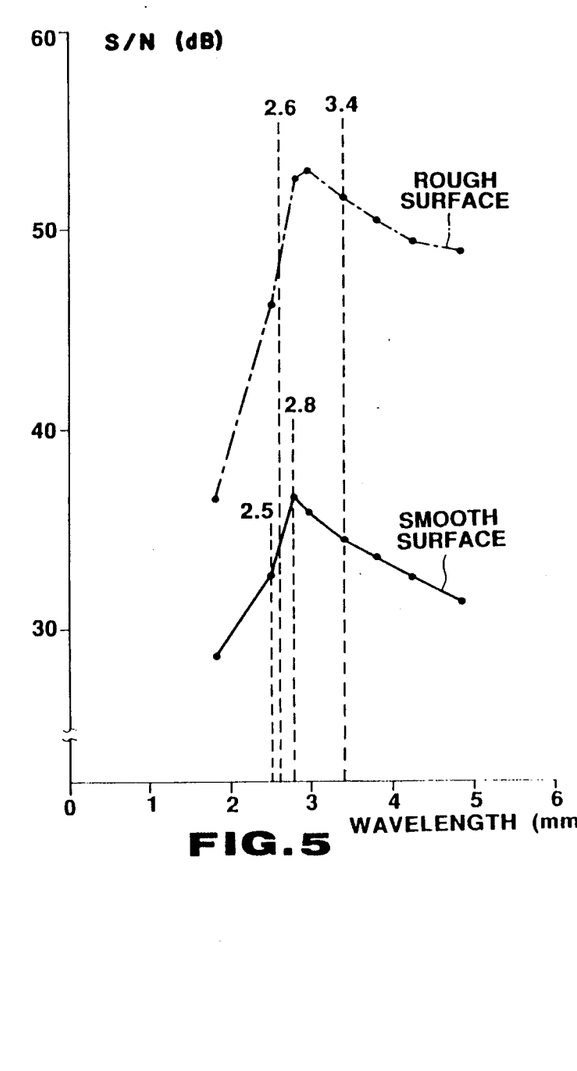
FIG. 5 is a graph illustrating the relationship between the S/N ratio of a Doppler frequency signal and the ultrasonic wavelength.

Referring now to FIG. 3, 4 and 5, a rough surface is indicated by a dotted line, while a smooth surface is indicated by a solid line. In the ultrasonic characteristic tests for the ultrasonic ground speedometer of the invention, the rough surface was constructed by arranging vinyl chloride pipes having an outer diameter of 6 mm on a road surface at constant intervals, while the smooth surface was constructed by spreading sand over a road surface.

The aformentioned arranged pipe and sand surfaces are substantially similar to standard rough and smooth driving surfaces with regard to their ultrasonic characteristics. This was assured by the inventors of the invention prior to the tests.

As appreciated from FIG. 3, in reflective characteristic tests on both rough and smooth road surfaces, the reflectivity $\beta$ of the ultrasonic wave is exponentially increased, as the wavelength becomes shorter. The inventors of the present invention assumed that the received efficiency of the ultrasonic wave was represented by the product $\alpha \cdot \beta$ of the previously described propagation ratio $\alpha$ and reflectivity $\beta$.

As clearly seen in the graphs of FIG. 4 and 5, with regard to the ultrasonic characteristics gained on the smooth road surface, the received efficiency $\alpha \cdot \beta$ of the ultrasonic wave and the observed S/N ratio of the Doppler frequency signal are increased, as the wavelength becomes longer in such a manner as to be substantially close to 2.8 mm and are decreased, as the wavelength becomes longer than substantially 2.8 mm. When the wavelength becomes shorter than 2.6 mm, the received efficiency and the S/N ratio becomes extremely lowered. As the wavelength becomes longer than 3.4 mm, the received efficiency and the S/N ratio become moderately lowered. As will be appreciated from the above, the received efficiency correlates closely with the S/N ratio. Note that in the ultrasonic characteristic tests made on the smooth surface, a high received efficiency $\alpha \cdot \beta$ is gained within a wavelength range of 2.6 mm to 3.4 mm. when comparing test data gained at the respective smooth and rough surfaces, the ultrasonic characteristic curves of the received efficiency $\alpha \cdot \beta$ and the S/N ratio gained in the rough surface test are slightly offset, from those of the smooth surface test, towards a longer wavelength (to the right, viewing FIGS. 4 and 5). Naturally, the peak points of the received efficiency $\alpha \cdot \beta$ and the S/N ratio gained on the rough surface are slightly offset from those of the smooth surface, also towards a longer wavelength. Actually, in the ultrasonic characteristic tests, the highest received efficiency and S/N ratio were gained at a wavelength of 2.5 mm, utilizing the smooth surface. On the other hand, the highest received efficiency and S/N ratio were gained at a wavelength slightly longer than 2.8 mm and shorter than 3.4 mm, for the rough surface. In other words, an optimal wavelength range, gained for ultrasonic characteristic curves on a rough surface, is slightly offset towards a longer wavelength than the previously described optimal wavelength range of 2.6 mm to 3.4 mm, gained on a smooth surface. On the whole, for ultrasonic characteristic tests respectively utilizing both rough and smooth surfaces, essentially the same dependency on the wavelength is seen. Therefore, since most vehicles tend to run more on smooth road surfaces rather than rough road surfaces, if the wavelength of the output ultrasonic wave from the transmitter 2 is a set to a value within a wavelength range of 2.6 mm to 3.4 mm, high received efficiency and a high S/N ratio may be gained on both smooth and rough road surfaces.

In FIG. 5, the two S/N ratio characteristic curves were measured at a vehicle speed of 40 km/h on both smooth and rough surfaces, as previously described. The two S/N ratio characteristic curves of FIG. 5 correlate closely to the two received efficiency characteristic curves of FIG. 4. This means that the S/N ratio of the Doppler shift signal is proportional to a received efficiency represented as the product of two ultrasonic characteristics, namely an in-air propagation ratio and reflectivity. This substantiates that the optimal wavelength range required for a higher S/N ratio in the Doppler shift signal is from 2.6 mm to 3.4 mm.

Although the aforementioned S/N ratio characteristic of the Doppler shift signal was observed at a vehicle speed of 40 km/h, the same dependency of S/N ratio on wavelength is seen at other vehicle speeds.

Figure 6:
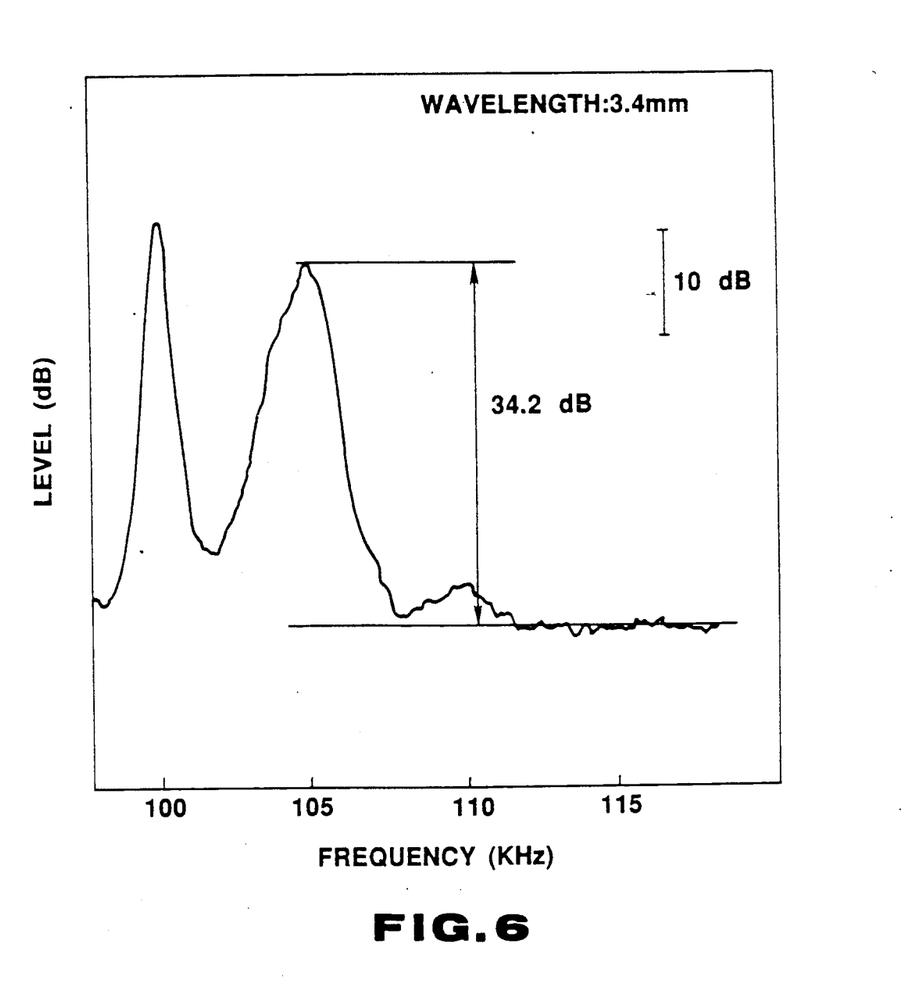
FIGS. 6 through 8 are graphs illustrating the original waveforms of the reflected ultrasonic wave signals generated by the ultrasonic receiver of the ultrasonic ground speedometer according to the invention, observed at respective, particular ultrasonic wavelengths, namely 3.4 mm, 2.8 mm and 2.5 mm.
Figure 7:
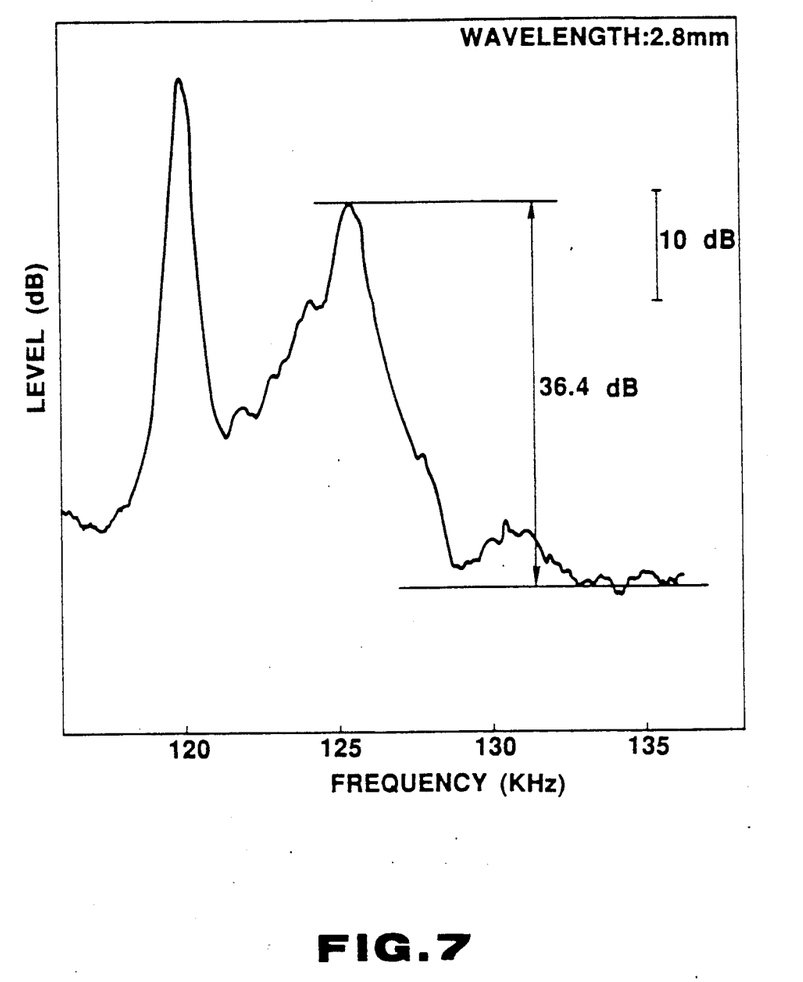
Figure 8:
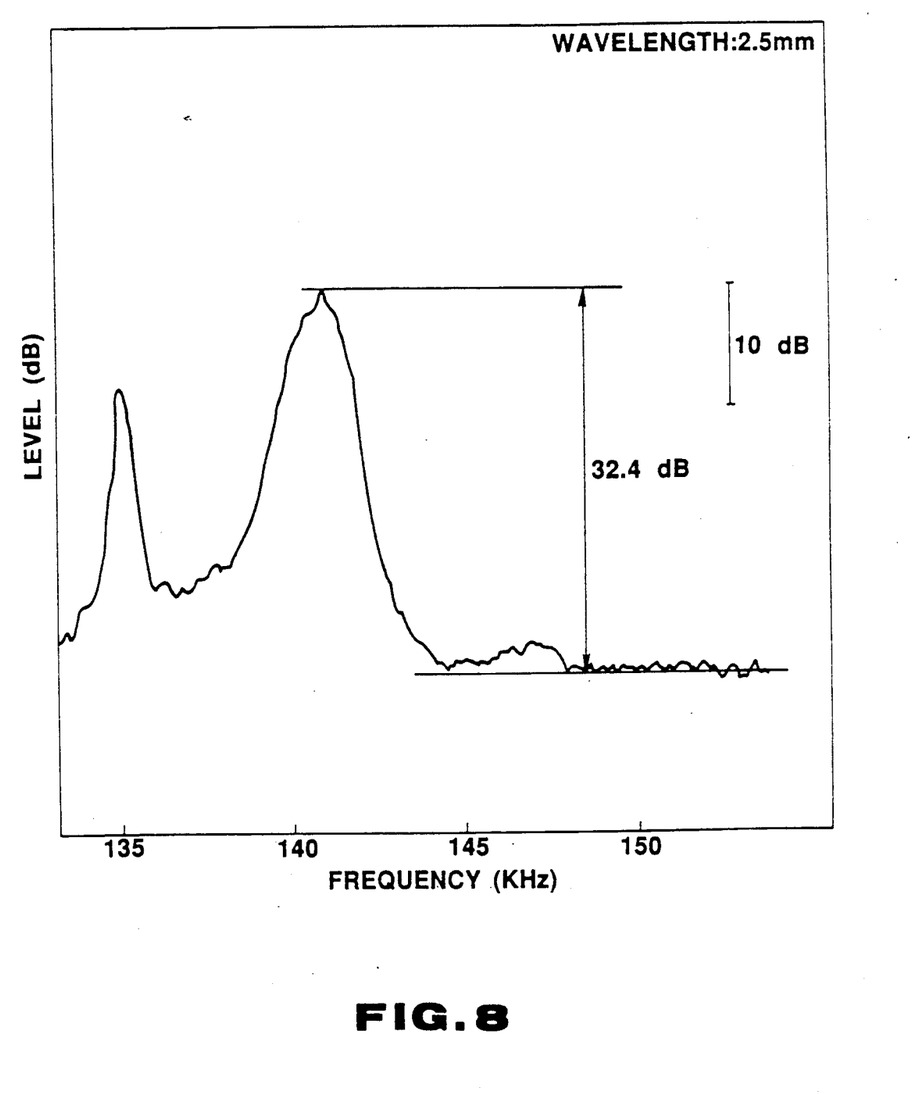

As further appreciated from the original waveforms of the reflected ultrasonic wave signals of FIGS. 6 to 8, out of three experimentally slected ultrasonic wavelengths, namely 3.4 mm, 2.8 mm and 2.5 mm, the highest S/N ratio (36.4 dB) was obtained with an output ultrasonic wave having a wavelength of 2.8 mm.

While the foregoing is a description of the preferred embodiment for carrying out the invention, it will be understood that the invention is not limited to the particular embodiment shown and described herein, but may include variations and modifications without departing from the scope or spirit of this invention as described by the following claims.

What is claim is :

1. An ultrasonic ground speedometer utilizing Doppler effect comprising:
   ultrasonic transmitting means for outputting an ultrasonic wave having a particular wavelength at a predetermined angle against a road surface;
   ultrasonic receiving means for receiving a reflected ultrasonic wave caused by reflection of the output ultrasonic wave from the road surface;
   arithmetic means for deriving ground speed from Doppler shift between frequencies of the output ultrasonic wave from said ultrasonic transmitting means and the reflected ultrasonic wave received by said ultrasonic receiving means; and
   means for setting said particular wavelength to a value within a range of 2.6 mm to 3.4 mm so as to enhance a received efficiency for the reflected ultrasonic wave, said received efficiency being dependent on a product of a ratio of propagation in-air of the output ultrasonic wave and a reflectivity of the output ultrasonic wave with regard to the road surface.

2. An ultrasonic ground speedometer utilizing Doppler effect comprising:
   ultrasonic transmitting means for producing an output signal having a particular wavelength, said ultrasonic transmitting means outputting an ultrasonic wave having said particular wavelength at a predetermined angle against a road surface;
   ultrasonic receiving means for receiving a reflected ultrasonic wave caused by reflection of the output ultrasonic wave from the road surface, said ultrasonic receiving means generating a reflected ultrasonic wave signal having the same frequency as the reflected ultrasonic wave;
   signal processing means for generating a Doppler shift signal on the basis of a frequency difference between the output signal from said ultrasonic transmitting means and the reflected ultrasonic wave signal from said ultrasonic receiving means, said signal processing means deriving ground speed from the Doppler shift signal; and
   means for setting said particular wavelength to a value within a range of 2.6 mm through 3.4 mm so as to enhance a received efficiency for the reflected ultrasonic wave, said received efficiency being dependent on a product of a ratio of propagation in-air of the output ultrasonic wave and a reflectivity of the output ultrasonic wave with regard to the road surface.

3. The ultrasonic ground speedometer as set forth in claim 2, wherein said ultrasonic transmitting means includes an oscillator for generating the output signal having said particular wavelength within said wavelength range of 2.6 mm to 3.4 mm, an echo sounder transmitter for emitting the output ultrasonic wave having said particular wavelength, and a drive circuit for amplifying the oscillator output signal and for driving the echo sounder transmitter via the amplified signal therefrom, and said ultrasonic receiving means includes an echo sounder receiver for receiving the reflected ultrasonic wave and for generating the reflected ultrasonic wave signal.

4. The ultrasonic ground speedometer as set forth in claim 3, wherein said echo sounder transmitter and said echo sounder receiver respectively include a piezoelectric echo sounding microphone.

5. The ultrasonic ground speedometer as set forth in claim 2, wherein said signal processing means includes a multiplier for deriving the frequency difference between the output signal frequency and the reflected ultrasonic wave signal frequency by multiplying both of the frequencies, a low-pass filter for filtering undesirable noise from the frequency difference signal generated by the multiplier, a zero-crossing comparator for waveform-shaping the filtered frequency difference signal representative of the Doppler shift signal, a pulse counter for counting pulses in the Doppler shift signal from the comparator and for deriving a Doppler frequency, and an arithmetic circuit serving as a Doppler-frequency to ground-speed convertor.

6. An ultrasonic ground speedometer utilizing Doppler shift between a reference signal transmitted in a predetermined medium and a reflected signal reflected through the medium from a road surface on which a vehicle travels comprising:
   ultrasonic transmitting means for outputting an ultrasonic wave through the medium at a predetermined angle against a road surface, the ultrasonic wave having a particular wavelength;
   ultrasonic receiving means for receiving through the medium a reflected ultrasonic wave caused by reflection of the output ultrasonic wave by the road surface;
   arithmetic means for deriving ground speed from a Doppler shift between frequencies of the output ultrasonic wave from said ultrasonic transmitting means and the reflected ultrasonic wave received by said ultrasonic receiving means;

means for setting said particular wavelength to a value within a range selected so as to enhance a received efficiency for the ultrasonic wave reflected through the medium, said received efficiency being dependant on a product of a ratio of propagation of the output ultrasonic wave through the medium and a reflectivity of the output ultrasonic wave with regard to the road surface; and wherein said predetermined medium being air and the selected range of wavelenghts being 2.6 mm to 3.4 mm.

* * * * *